350-276

CROSS REFERENCE SEARCH ROOM

June 21, 1960 G. L. BEERS 2,942,254

IMAGE VIEWING APPARATUS

Filed Oct. 1, 1956 2 Sheets-Sheet 1

INVENTOR.
GEORGE L. BEERS

BY [signature]
ATTORNEY

IMAGE VIEWING APPARATUS

Filed Oct. 1, 1956 2 Sheets-Sheet 2

INVENTOR.
GEORGE L. BEERS
BY [signature]
ATTORNEY

United States Patent Office 2,942,254

Patented June 21, 1960

2,942,254

IMAGE VIEWING APPARATUS

George L. Beers, Haddonfield, N.J., assignor to Radio Corporation of America, a corporation of Delaware Filed Oct. 1, 1956, Ser. No. 613,198

10 Claims. (Cl. 340—367)

The present invention relates to new and improved image viewing means and, particularly, to novel masking means for use in minimizing the image degrading effects of ambient light.

In the case of television receivers employing directly viewed kinescopes, for example, there has long existed the problem of image contrast degradation by reason of the reflection of ambient light from the face or viewing screen of the kinescope or from the usual safety glass which is normally located between the kinescope and the viewer. That is to say, stray light, whether natural light or artificial light within the room in which the receiver is located, strikes the polished surface of the kinescope or safety glass and is reflected to the eyes of the viewer together with the light from the television image itself. The phosphor screen of a kinescope also reflects ambient light so that image contrast suffers, since the phosphor material is normally light reflecting.

Such stray light reflections, as will be understood, decrease the contrast of the television image in an undesirable fashion so that it has become necessary in many cases to extinguish much of the normal room lighting when a television program is being viewed. In addition to the restriction which it places upon normal activities, the practice of darkening a room in order to view an image has been found to be annoying in that an image has a glaring effect in the absence of a resonable degree of ambient light. This problem exists in connection with projection systems for film or slides and is particularly severe in projection systems which employ a light-reflecting screen, since the screen must necessarily reflect all light incident thereon, including any undesired ambient light.

In the case of black and white images, the degradation of contrast frequently produces the subjective effect of a loss in picture detail or resolution and, in the case of color images, a serious loss in saturation occurs such that colored areas intended to be highly saturated or vivid are diluted by the ambient light and appear as pastel.

It is, therefore, a primary object of the present invention to provide new and improved means for reducing the effects of ambient light upon the contrast of a light image on a viewing screen.

One factor which has heretofore complicated the attempts to rectify the foregoing described difficulties is the matter of viewing directivity. That is, in the case of television home receivers and film projectors, it is usual for viewers to be located at various positions in front of the screen, so that any device which is to be effective in reducing ambient light reflections must, if it is to be practical, permit viewing of the television image from different positions in the horizontal plane. Television programs and motion pictures or slides projected on a screen are generally observed through a viewing angle which is quite narrow in the vertical plane, since the viewers are either seated or standing, but in a moderately wide angle in the horizontal plane. Horizontal viewing angles of the order of plus or minus 30 to 45 degrees from the normal and vertical angles of plus or minus 10 degrees are generally considered acceptable. In the average home or auditorium much of the ambient light which reaches the face of a television picture tube or projection screen originates outside the useful viewing angle, particularly by reason of the fact that light colored walls and ceilings serve to reflect light from lamps and the like toward the screen.

It is a further object of the present invention, therefore, to provide novel means associated with an image viewing screen, which means permits viewing of a reproduced image through a selected viewing angle in either the horizontal or vertical plane and which prevents substantially all light originating outside this viewing angle from reaching the viewing screen.

In the earlier filed co-pending application of the present applicant, S.N. 536,508, filed Sept. 26, 1955, there is disclosed in general a novel viewing device in the nature of a honeycombed or cellular structure formed of light absorbing material and having no polished surfaces, which device is adapted to be located directly in front of the viewing screen of a cathode ray tube or a screen on which a projected image is viewed. Light from the screen passes to the eyes of the viewers through the interstices of the honeycomb structure, while ambient or stray light directed toward the viewing screen is, for the most part, absorbed by the walls of the honeycomb structure.

As is pointed out in the cited application, a minimum ratio of wall-thickness to total area must be maintained in order for the desired amount of light transmission to be realized. That is, as the size of the cellular openings is decreased, the thickness of the honeycomb walls must also be decreased if the same degree of light transmission is to be maintained. The size of the cellular openings is, moreover, directly related to the image detail to be observed since, in order for fine image detail to be visible, the cellular openings should be at least as fine as and preferably finer than the smallest incremental area in the image which is to be visible, for otherwise portions of the image detail are obscured by the walls of the honeycomb when the observer is located off-axis. Thus, as the size of the picture becomes smaller, the size of the cell openings must decrease. Ultimately, a point is reached where the cell size cannot be reduced and maintain a satisfactory relationship between wall thickness and cell opening.

In addition to this general matter of information, color image-reproducing devices of the so-called "dot screen" variety pose a still different problem. That is, the image screen of such a tube comprises a multiplicity of trios of different color light producing phosphor dots. If the cells of a honeycomb viewing screen are of such a size that the cell walls obstruct the light from individual dots in these trios of dots, a moiré pattern is produced. On the other hand, if the cellular openings are made large enough to avoid the moiré pattern, the cell structure may be visible at normal viewing distances and the loss of picture detail with off-axis viewing will be encountered.

Thus, an important object of the present invention is to overcome these undesirable effects of a stationary viewing device of the type described, while yet retaining its advantages.

In general, the present invention provides, in addition to a cellular or honeycombed viewing device which is located in front of an image screen, means for producing relative oscillatory movement between the cellular openings of the viewing device and the image being viewed and in a plane parallel to the image plane. As a result of such relative movement, the cellular openings of the screen move with respect to the image and thereby scan the entire image area so that all of the information in the picture is visible even to an observer located at an angle with respect to the perpendicular to the screen.

Likewise, since the walls of the screen are moving, they can obstruct only momentarily the light from any particular phosphor dot, so the moiré difficulty is avoided. Furthermore, the cell walls move back and forth at a rate which makes it impossible for the eye to see the screen structure.

Additional objects and advantages of the present invention will become apparent to those skilled in the art from a study of the following detailed description of the accompanying drawing, in which.

Figures 1, 2, 3, 4, 5, 6, 10:
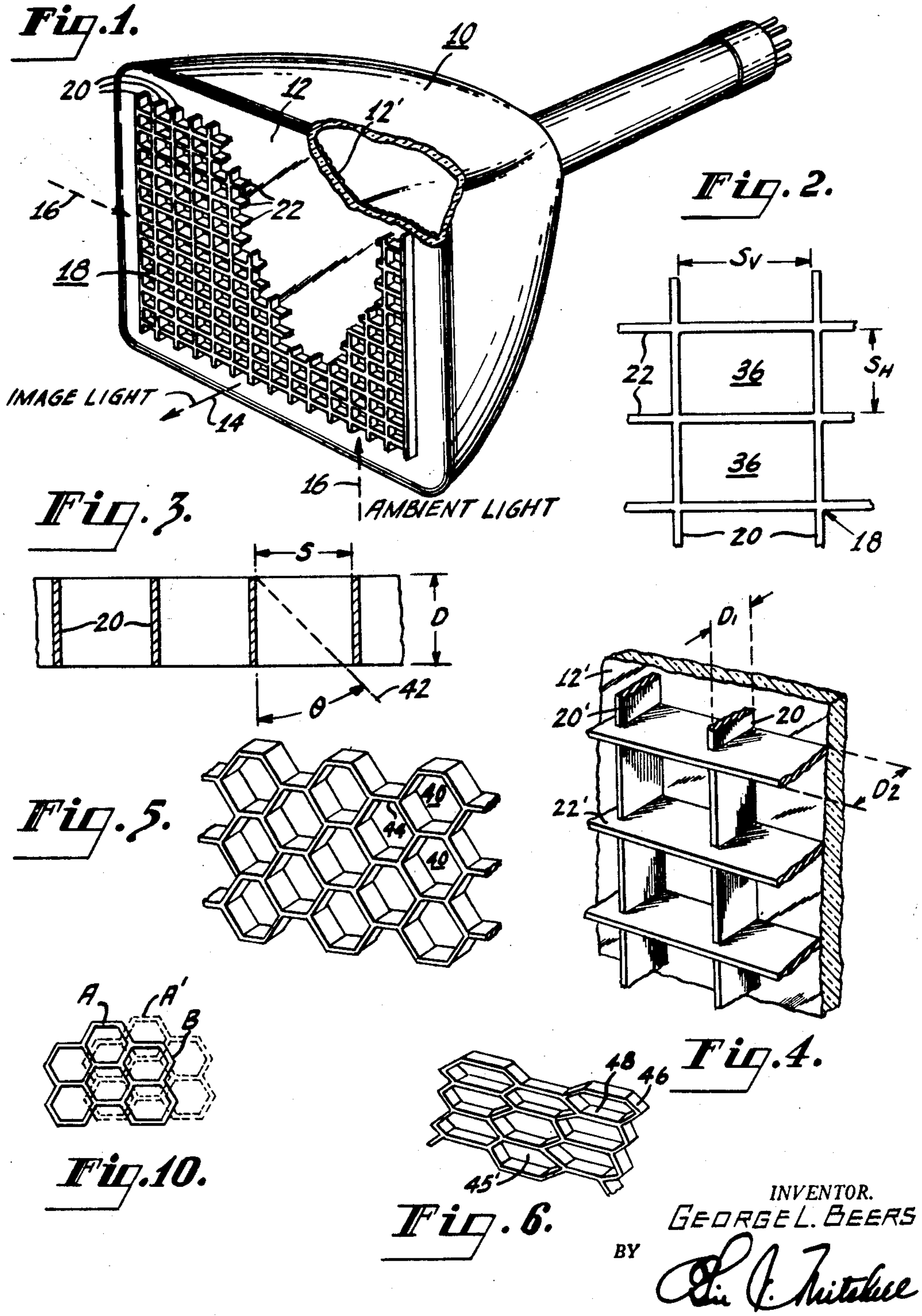
Figure 1 is an isometric view of a cathode ray tube kinescope provided with a viewing structure in accordance with the invention.
Figure 2 is a fragmentary, front elevation view of one form of viewing device with which the invention may be employed.
Figure 3 is a horizontal sectional view of the viewing device of the preceding figures, illustrating certain dimensional relationships to be described.
Figure 4 is an isometric view of another form of viewing device with which the invention may be used.
Figures 5 and 6 illustrate still different forms of viewing devices to which the present invention is applicable.
Figure 10 is a fragmentary illustration of a viewing device to be described.

Referring to the drawing and, particularly, to Figure 1 thereof, there is shown a cathode ray tube 10 of the type normally employed as a directly-viewed image-reproducing tube in home television receivers. The tube 10 has a glass face plate or viewing screen 12 whose rear surface has deposited thereon suitable cathodo-luminescent phosphor material 12' which emits light in response to electron beam impingement. As is understood, the television image is reconstructed on the face plate or screen 12 by the scansion of the screen by a beam of electrons, intensity-modulated in accordance with the image signals. Thus, as the electron beam scans the screen in a line-by-line fashion, the light image is reconstructed on the screen and emanates therefrom as indicated by the arrow 14. Ambient light such as sunlight, light from ceiling lamps, table lamps and the like may strike the screen 12 and its phosphor layer 12' from any direction, as indicated by the arrows 16. Since the ambient light which strikes the polished surface of the screen 12 or the phosphor layer 12' is reflected therefrom, the mixture of the reflected ambient light and the image light from the phosphor screen of the tube causes the image contrast to be substantially diminished so that a rather "faded" picture results.

In order to reduce the deleterious effect of the ambient light upon the image, the structure indicated in its entirety by reference numeral 18 is provided in accordance with one arrangement disclosed in the above-cited application. This structure may be termed a honeycomb arrangement in that it is made up of intersecting vertical slats 20 and horizontal slats 22, the edges of the slats 20 and 22 being disposed in generally the same plane. The slats 20 and 22 will be understood as being formed of extremely thin or ribbon-like strips of material having sufficient rigidity to maintain their shape. Moreover, the slats 20 and 22 are of opaque material, preferably with a light-absorbing mat surface. For example, the slats may be formed of any suitable plastic resin material such as "Bakelite" and may further be provided with a mat surface as through a coating of a composition comprising a high concentration of carbon black dispersed in a binder such as shellac. Alternatively, the slats may be formed of metal such as aluminum which is provided with a mat surface in any well known manner.

As may be seen from the enlarged, fragmentary front view of Figure 2, the vertically disposed slats 20 are separated by an air space $S_v$, while the horizontally disposed slats 22 are separated by an air space $S_h$. With the slats 20 and 22 arranged at right angles to each other, the interstices 36 are of rectangular cross section and of the dimensions $S_v$ and $S_h$ in the plane of the drawing.

While the showing of Figure 2 indicates the dimensions of the interstices between the slats in the plane of the drawing, the depth of the honeycomb structure may be better understood from the sectional view of Figure 3, wherein reference numerals identical to those employed in the preceding figures indicate corresponding elements. The dotted line 42 in Figure 3 represents an extreme ray of light (i.e., in the horizontal plane) which defines an angle $\theta$ with respect to the side of the slat 20, as shown. It may also be seen that the tangent of the angle $\theta$ may be expressed by $S/D$, where D is the depth of the slat 20. Any ambient light rays whose angle of incidence on the screen is greater than the angle $\theta$ will be absorbed by the opaque strip 20 and will thereby be prevented from affecting the contrast of the television image being produced. Conversely, observers located at any point within the angle $\theta$ (on either side of the slat) can view the television image.

It may be understood from the foregoing that the effectiveness of the honeycomb structure of slats in preventing ambient light from degrading image contrast and the directivity of the structure insofar as viewing of the image is concerned are both related to the geometry of the structure and, particularly, to the dimensions "D" and "S." That is, for a given spacing S between adjacent slats, the greater the depth D is, the smaller will be the angle $\theta$ and, therefore, the greater will be the effectiveness of the slats in preventing ambient light from reaching the kinescope screen. On the other hand, with a given depth D, an increase in the dimension S results in an increase in the angle through which the screen may be observed but a decrease in the amount of ambient light blocked from the screen.

It is usually desirable, as stated, that a television screen be seen over a moderately large angle in the horizontal plane, and, since the height at which the observer is normally located is usually within a rather small range (e.g., 3 to 6 feet above the floor), the viewing angle in the vertical plane is of a lower order. The arrangement of Figures 1 through 3 provides an effective light shield in which the spacing $S_v$ (i.e., the space between the vertically oriented strips 20) is greater than the spacing $S_h$ between the horizontally oriented strips. In this way, the angle of incidence in the vertical plane of ambient light which can reach the viewing screen of the kinescope is substantially decreased, while the angle in the horizontal plane within which the screen may be viewed is large enough to permit viewing from a plurality of positions within the room in which the receiver is located. The depth D of both the horizontal slats 22 and the vertical slats 20 is the same in this case.

The above-cited application discloses other forms of viewing devices which, in the interest of completeness of description, will be disclosed briefly herein in connection with Figures 4–6. In accordance with the arrangement shown in Figure 4, the parameter D is changed as between the slats 22 and the slats 20 and the spacings $S_v$ and $S_h$ are equal. As may be seen from Figure 4, the depth $D_1$ of the vertically oriented slat 20' (corresponding in position to the slats 20 of the preceding figures) is less than the depth $D_2$ of the horizontally oriented slats 22". Since the spacing between the horizontal slats is equal to the spacing between the vertical slats, it will be understood that the viewing angle of the screen 12 in Figure 4 in the horizontal plane is greater than it is in the vertical plane and, moreover, that the angle of incidence of ambient light within which such light can reach the screen 12 is substantially smaller in the vertical plane than in the horizontal plane.

Figure 5 discloses a viewing device which comprises a honeycombed structure whose walls 44, when viewed edgewise, deviate from straight lines so that they do not define continuous straight lines in any direction. That is, the honeycomb is made up of cells 40 of generally hexagonal cross-section so that there are no continuous edges which form straight vertical or horizontal lines.

As is illustrated in Figure 6, the cellular openings 45' may be shaped in such manner as to afford selective directivity of viewing angle and the effective angle within which ambient light can effect image contrast. That is, the vertical expansion of the strips 46 (in the plane of the drawing) is less than that illustrated in Figure 5, so that the interstices 45' are elongated horizontally. Since the interstices are greater horizontally than vertically, the viewing angle in the horizontal plane is greater than in the vertical plane, so that ambient light in the vertical plane is more greatly absorbed without decreasing too greatly the permissible range of viewing in the horizontal plane.

As will be recognized from the foregoing, the structures illustrated in Figures 1–6 constitute viewing devices in accordance with the above-cited application which, when located in front of an image viewing screen, serve to decrease the effects of ambient light on the contrast of the image, by virtue of the fact that the ambient light approaching the viewing screen from an angle outside of that determined by the depth of the walls forming the screen and their separation is absorbed by the walls. As has been stated, however, it has been found that improved operation is afforded by effecting relative movement between the image viewing screen and the viewing device. Specifically, the present invention provides means for effecting a generally oscillatory movement between the viewing device and the viewing screen, whereby the interstices formed by the walls of the device actually "scan" the viewing screen, so that all portions of the screen are made visible to observers located within the viewing angle as explained above. Stated otherwise, such relative movement between the viewing device and the viewing screen permits such an observer to see all of the screen during each complete cycle of movement. In this manner, moiré patterns which might otherwise result from the use of a stationary screen in front of a color television image reproducer, for example, are substantially eliminated. Also, and more generally, off-axis image viewing is improved by reason of the fact that substantially all of the image information is visible to the observer located within the viewing angle.

Figures 7, 8, 9, 11:
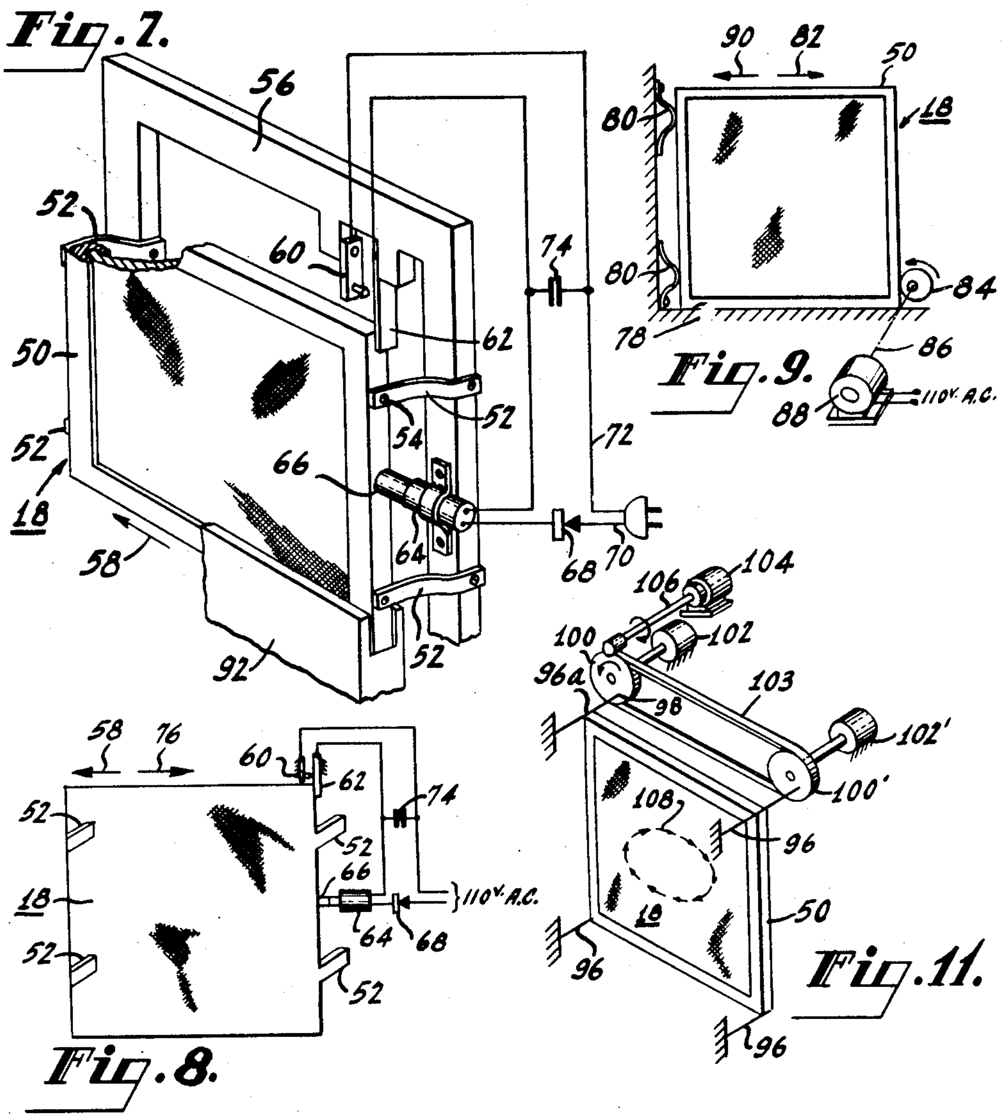
Figures 7–9 illustrate certain specific arrangements in accordance with the present invention.
Figures 11 and 12 illustrate additional forms of the invention.

Figure 7 illustrates a specific form of apparatus for producing such relative movement between the viewing device and the viewing screen. By way of example, the apparatus of Figure 7 may be mounted in the front wall of a television receiver cabinet and located directly in front of the television kinescope (e.g., the kinescope 10 of Figure 1). In Figure 7, the viewing screen is indicated generally by reference numeral 18 and may take any of the forms illustrated in Figures 1–6, for example. The screen 18 includes a rigid frame 50 which is supported near its corners by leaf springs 52 in what may be considered as a "floating" arrangement. That is, each of the springs 52 is secured at one end, as by means of a screw 54, to the viewing device frame 50 and, at the other end, to a supporting frame 56. The frame 56 may be part of the receiver cabinet itself or otherwise held rigidly in place in the cabinet. The springs 52 are so shaped as to urge the viewing device 18 in the direction of the arrow 58 in Figure 7. Also supported by the frame 56 are a first switch contact member 60 and a movable spring-like contact member 62, normally in electrical contact with the member 60. A plunger-type solenoid 64 is also supported by the frame 56 adjacent to that side of the frame 50 remote from the direction in which the springs 52 normally urge the frame. The solenoid plunger 66 is attached by suitable means to one side of the frame 50 so that movement of the plunger causes the screen 18 to move with it.

The solenoid 64 is electrically energized in the following manner: Assuming that the receiver is of the home instrument type such that it is desirable that the apparatus in question be energizable from the usual 110 v. A.C. supply, a rectifier 68 is connected in series with one of the solenoid leads 70, the other of the solenoid leads 72 being in two parts adapted to be joined electrically by the switch contact members 60 and 62. A filter capacitor 74 is connected across the leads 70 and 72 for filtering the direct current produced by the rectifier 68. It is to be noted that the spring-like contact member 62 is adapted to be engaged by the right-hand edge of the viewing device frame 50 and moved thereby out of contact with the member 60.

The operation of the apparatus of Figure 7 may be more readily understood from the simplified showing of Figure 8 wherein reference numerals identical to those employed in Figure 7 indicate the same parts. When the viewing device 18 is in its extreme left-hand position as indicated in Figure 8, the switch contact members 60 and 62 are in electrical engagement, thereby completing the solenoid energizing circuit. When energized, the solenoid 64 pulls the viewing device 18 to the right, or in the direction of the arrow 76. In its movement to the right, the frame of the device 18 engages the spring-like switch member 62 and moves it out of engagement with the contact 60, thereby opening the solenoid circuit so that the solenoid is deenergized. Deenergization of the solenoid 64 permits the springs 52 to move the viewing device 18 in the direction of the arrow 58 until the switch member 62 again engages the member 60 to close the solenoid circuit, thereby beginning another cycle of the operation.

As will be appreciated, the speed and amplitude of the movement thus imparted to the viewing device 18 are a function of the stiffness of the springs 52, their length, and the mass of the device 18.

In general, it is sufficient that the amplitude of such movement be at least of the order of the size of the interstitial openings of the viewing device. In one specific arrangement, the viewing device was formed of aluminum strips 0.0009" in thickness and approximately 3/64" in depth, the interstices being approximately 1/16" wide. This device, when employed with a 21" color kinescope of the dot screen variety was moved at the rate of approximately 16 cycles per second and through a distance of approximately 1/16". This movement substantially eliminated all moiré patterns.

It will be apparent that the "floating" arrangement of Figures 7 and 8 affords the advantages of extremely low friction and low power requirements. While this arrangement is, therefore, particularly desirable, it will be understood that other arrangements may be employed to produce the relative movement between the viewing screen and viewing device in accordance with the invention. For example, as shown in Figure 9, the viewing device may be supported for sliding movement on a fixed surface 78. Leaf springs 80 normally urge the device 18 to the right, or in the direction of the arrow 82. Reciprocatory sliding movement of the viewing device 18 is effected through the agency of a cam which may comprise simply a disk 84 eccentrically mounted on the shaft 86 of a motor 88. That is, each rotation of the cam 84 will move the viewing device 18 in the direction of the arrow 90, thereby compressing the springs 80 which, in turn, will urge the device 18 in the direction of the arrow 82 as the cam 84 continues to rotate.

It will be appreciated that in both arrangements of Figures 7 and 9, the viewing device 18 may serve as a protection against flying fragments of glass as in the case of kinescope implosion. That is, and as is indicated in Figure 7, for example, the device 18 may be supported within a channel-like member 92 which prevents fore-and-aft movement of the device 18, while permitting its desired movement in a plane parallel to the viewing screen.

In the forms of the present invention illustrated by Figures 7 and 9, the oscillatory motion imparted to the honeycomb viewing device is a simple reciprocating motion. It has been found that when such reciprocating motion is imparted to a viewing device having no continuous straight lines (e.g., the devices of Figures 5 and 6), the entire image area of the viewing screen is "scanned" even though the movement is only in a single direction (e.g., horizontal or vertical). The reason for this complete scanning is that, as the honeycomb device moves a distance at least as great as the dimension of one cellular opening, a generally vertically extending cell edge or wall is replaced by a generally horizontally extending wall.

This action may be better visualized from the showing of Figure 10 wherein a fragmentary portion of the device of Figure 5 is illustrated. The device is shown in solid lines for one position and in dotted lines for a second position. While the dotted line shows a horizontal displacement of the device such that the cell designated "A" is moved to position "A′," it will be noted that the position occupied by cell "A′" is identical to that which would have been occupied by cell B if the device had been moved vertically. Thus, while the movement of only a single cell has been described, it will be understood that all of the cells are displaced in the same manner. It will be seen, therefore, that by a horizontal movement of the viewing device, a scanning component in both horizontal and vertical directions is accomplished.

Even in the case of a viewing device such as those illustrated in Figures 1–4, namely, one having straight slat walls, a simple reciprocating motion in a direction parallel to one set of its slats will afford somewhat improved operation, although not as great as that obtained with the other forms of viewing devices. For example, if the device of Figure 2 is moved horizontally, an observer located in a position which is off-axis horizontally from a perpendicular to the center of the viewing screen will be benefited by the reciprocation of the viewing device. Similarly, if this device were reciprocated vertically, an observer located in a position which is off-axis vertically from a perpendicular to the center of the viewing screen would be benefited by the vertical movement of the horizontal slats. By "axis" is meant the perpendicular to the center of the screen.

While the apparatus of Figure 9 includes a simple single-throw cam, whereby the amplitude of displacement is the same for each cycle, it will be appreciated that a cam having a plurality of lobes, each of different throw from the other lobes, may be employed. With such cam, successive cycles of movement of the viewing device will be different so that the positions at which the viewing device reverses its direction of movement in successive cycles are different.

Figure 11, however, illustrates apparatus in accordance with another form of the invention, namely, one in which the motion imparted to the viewing device is generally circular rather than reciprocating. Such motion avoids the reversal of direction of motion which occurs with a reciprocating screen and, moreover, is particularly effective in causing a viewing device having straight walls to scan the image area completely. In Figure 11, the screen 18 is supported at each of its four corners by a length of spring wire 96 welded or otherwise rigidly secured to its frame 50 and supported by a rigid member (not shown) which may, for example, be a part of the receiver cabinet when used with a television kinescope. One of the support springs 96 is provided with an extension 96*a* which is received in an aperture 98 located eccentrically of a pulley 100 whose central shaft is journaled in a bearing 102. A small drive motor 104 which may be of the type conventionally used in driving phonograph record player turntables is arranged with its shaft 106 in frictional engagement with the pulley 98. Another one of the springs 96 is also drivingly engaged by a pulley 100′ which is supported for rotation by a shaft journaled in a bearing 102′ and which is driven by a belt 103 from the pulley 100. The belt 103 may be of the V-belt variety located in V-grooves in the pulleys so that the shaft 106 can engage the pulley 100. The pulleys 100 and 100′ are identical and are driven in unison. Other driving means such as gears or the like may be employed.

In the operation of the apparatus of Figure 11, rotation of the motor shaft 106 drives the pulley 100 and, by reason of the eccentric engagement of the spring extension 96*a* with the pulley, the viewing device 18 is caused to move in a generally circular or closed-loop path in its own plane as indicated by the arrows 108. Such movement of the viewing device, even in the case of the straight-walled devices of Figures 1–4, causes the cellular openings to scan the image area completely so that no detail is obscured insofar as an observer located at an angle to the screen perpendicular is concerned.

Figure 12:
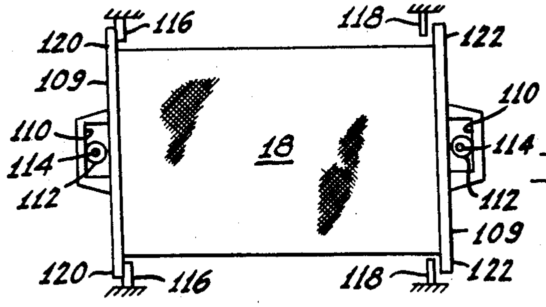

While the specific forms described thus far for effecting the oscillatory movement of the viewing device in accordance with the invention involve the use of a rigid viewing device, it will be recognized that the desired effect of relative movement between the viewing screen and viewing device may be achieved through the use of a viewing screen formed of a material of sufficient elasticity to permit slight stretching. That is, the viewing device 18, as in Figure 12, may be formed of a suitable thermoplastic material having the requisite elasticity and of the shape of Figure 5 and may be alternately stretched and released by suitable mechanical means to produce an effective movement of the interstices of the device with respect to the viewing screen.

For example, the device 18 may be provided with rigid end pieces 109, each having an opening 110 at each side to receive a cam 112 eccentrically mounted on a driver shaft 114. Fixed stop members 116 and 118 are adapted to engage vertical extensions 120 and 122 of the frame 50, as shown. Thus, as the cams 112 are rotated about their respective shafts 114, suitably phased, the screen 18 will be stretched horizontally, first to the right while the end piece 120 is held against the stops 116 and the end piece 122 is moved to the right by its cam 112 and, secondly, to the left while the end piece 120 is held against its stops 118 and the end piece 120 is moved to the left by its cam 112. Such alternate stretching of the screen 18 from left-to-right and from right-to-left causes its cellular opening to move effectively with respect to the viewing screen (not shown) with which it is associated.

Despite the fact that the present invention has been illustrated herein in conjunction with cathode ray tube kinescope viewing screens, it is to be borne in mind that the invention is also applicable to other viewing screens, including front- and rear-projection screens such as those employed, for example, in the projection of motion picture film images.

Having thus described my invention, what I claim as new and desire to secure by Letters Patent is:

1. In combination with a cathode ray tube having a viewing screen from which image light emanates, a light-masking device for limiting the degrading effect of ambient light on such image, which device comprises a plurality of strip-like elements of light-absorbing material arranged to form a cellular structure, said device being located in front of said cathode ray tube viewing screen such that light therefrom may be viewed through the interstices of said structure; and means for producing continuous oscillatory movement between said viewing screen and the interstices of said cellular structure.

2. In an image viewing system which includes a viewing screen from which image light emanates, a honeycomb structure of light-absorbing material located in front of such screen so that light from such screen may be viewed through the interstices of said structure; and means for producing continuous movement of said structure with respect to said viewing screen.

3. In an image viewing system which includes a viewing screen, a light-masking device which comprises a plurality of strip-like elements of light-absorbing material arranged to form interstices between themselves and located in front of such screen so that light from such screen may be viewed through said interstices; and means for producing continuous oscillatory movement between said screen and said elements.

4. In an image viewing system which includes a cathode ray tube having a viewing screen from which image light emanates, a light-masking device which comprises a plurality of strip-like elements of light-absorbing material arranged to form interstices between themselves and located in front of such screen so that light from such screen may be viewed through said interstices; and means for imparting continuous oscillatory motion to said device.

5. The invention as defined by claim 4 wherein said last-named means comprises means for reciprocating said device through different distances during successive cycles of oscillatory motion.

6. In an image viewing system which includes a viewing screen from which image light emanates, a light-masking device for limtiing the degrading effect of ambient light on such image, which device comprises a plurality of strip-like elements of light-absorbing material arranged to form a cellular structure whose interstices are greater in a first direction than in the direction perpendicular to said first direction, said device being located in front of said viewing screen such that light therefrom may be viewed through said interstices; and means for causing said device to continuously reciprocate in a plane parallel to that of such screen and in said first direction.

7. In an image viewing system which includes a viewing screen, a viewing device which comprises a plurality of walls which define a honeycombed structure having cellular openings, said device being located in front of such screen so that light from said screen may be viewed through said openings, said walls being extremely thin compared to the size of said openings; and means for effecting an oscillatory relative movement between the openings of said honeycombed structure and said viewing screen.

8. In an image viewing system which includes a viewing screen, a viewing device which comprises a plurality of walls which define a honeycombed structure having cellular openings, said device being located in front of said screen so that light from said screen may be viewed through said openings; and means for effecting an oscillatory relative movement between the openings of said honeycombed structure and said viewing screen in a plane parallel to said screen, said means comprising spring means for supporting said viewing device and urging said viewing device in such plane in a first direction and means for periodically overcoming the urging of said spring means to move said viewing device in the opposite direction.

9. In an image viewing system which includes a viewing screen, a light-masking device which comprises a honeycombed structure made up of a plurality of walls of light-absorbing material which define cellular openings, said walls being disposed relative to each other such that their edges deviate from a straight line, said structure being disposed in front of such screen with said walls substantially perpendicular to said screen and means for producing continuous movement between said device and such screen.

10. In an image viewing system which includes a viewing screen, a light-masking device which comprises a plurality of elastic walls which define a honeycombed structure having cellular openings, said device being located in front of such screen so that light from such screen may be viewed through said openings; and means for stretching said device in a plane parallel to such viewing screen.

References Cited in the file of this patent

UNITED STATES PATENTS

| | | |
|---|---|---|
| 2,029,500 | O'Brien | Feb. 4, 1936 |
| 2,186,203 | Centeno | Jan. 9, 1940 |
| 2,388,203 | Zindel | Oct. 20, 1945 |
| 2,691,774 | De Gier | Oct. 12, 1954 |